United States Patent
Mee et al.

(10) Patent No.: US 6,236,853 B1
(45) Date of Patent: May 22, 2001

(54) CALLED MOBILE SUBSCRIBER PRESENT STATUS

(75) Inventors: John Mee, Dublin; Patrick Maquire, Drumdery Ballinamore, both of (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/172,294

(22) Filed: Oct. 14, 1998

(30) Foreign Application Priority Data

Oct. 15, 1997 (SE) .................................................. 9703759

(51) Int. Cl.$^7$ ...................................................... H04M 3/42
(52) U.S. Cl. ........................... 455/414; 455/432; 455/421
(58) Field of Search .................................... 455/412, 414, 455/422, 432, 433, 435, 445, 456, 421, 458, 417, 427, 428; 379/210, 211, 212, 188, 196, 197, 198

(56) References Cited

U.S. PATENT DOCUMENTS

| | | | |
|---|---|---|---|
| 5,479,482 | 12/1995 | Grimes ................................. | 455/556 |
| 5,694,453 | 12/1997 | Fuller et al. ......................... | 455/31.2 |
| 5,966,656 | * 4/2000 | Elkin et al. .......................... | 455/421 |
| 6,055,426 | * 4/2000 | Beasley ................................ | 455/432 |

FOREIGN PATENT DOCUMENTS

WO 98/10601   3/1998 (WO).

OTHER PUBLICATIONS

International Search Report Date of Search: May 29, 1998; Date of Mailing: Jun. 5, 1998.

* cited by examiner

*Primary Examiner*—Marsha Banks-Harold
(74) *Attorney, Agent, or Firm*—Burns, Doane, Swecker & Mathis, L.L.P.

(57) ABSTRACT

The present invention relates generally to the problem of providing information about a called subscriber's status in a mobile communications system, and more particularly to the problem that occurs when a caller is unable to determine whether the subscriber being called is either out of the service area or has merely switched off his mobile phone. A new parameter MSSTATUS is given which will indicate the status of a Mobile Station as ready to receive a call, MSSTATUS=ZOK, powered off as in an IMSI detach, MSSTATUS=ZIMSIDETACH, or out of the coverage area, MSSTATUS=ZIMPLICITDETACH. A message will then be given to the caller which may provide a more detailed description of the status of the subscriber being called. In addition, a new Interrogation Facility is provided which will give the caller the opportunity to receive information on the time and date of detach, IMSI or implicit, the specific reason for their unavailability, and the location of the person being called when detach occurred.

14 Claims, 3 Drawing Sheets

CALLED MOBILE SUBSCRIBER PRESENT STATUS

This application claims priority under 35 U.S.C. §§119 and/or 365 to 9703759-2 filed in Sweden on Oct. 15, 1997; the entire content of which is hereby incorporated by reference.

FIELD OF THE INVENTION

The present invention relates generally to the problem of providing information about a called subscriber's status in a mobile communications system, and more particularly to the problem that occurs when a caller is unable to determine whether the subscriber being called is either out of the service area or has merely switched off his mobile phone.

RELATED ART

In FIG. 1 is shown a mobile communications system such as GSM ("Global System for Mobile communications"), AMPS or PDC. The background discussion here will focus on a system which corresponds to GSM. However, it can be appreciated by a person skilled in the art that there are many similarities between mobile systems and many of the problems in one system also exist in others.

A typical system, as in GSM, has a particular geographic area covered by each system operator. This geographic area is divided into cells, drawn as hexagons for ease of design and cell planning. These hexagons symbolize each "cell". Each cell will also have an antenna for transmitting and receiving radio signals from the various mobile stations ("MS") within their coverage area. The mobile station is the physical equipment used by a subscriber to gain access to the Public Land Mobile Network ("PLMN"), which is a mobile network for a given operator. The PLMN is established and operated by an administration or its licensed operators for the specific purpose of providing land mobile communication services to the public.

Every telephone network needs a certain structure in order to route incoming calls to the correct exchange and finally to the called subscriber. In a mobile network this structure is of even greater importance because of the mobility of its subscribers. The links between a GSM/PLMN network and other PSTN ("Public Switched Telephone Network") ISDN ("Integrated Services Digital Network") or PLMN networks will be on the level of international or national transit exchanges. All incoming calls for a PLMN network will be routed to one or more Gateway Mobile Switching Centers ("Gateway MSC" or "GMSC"). A Gateway MSC works as an incoming transit exchange for the PLMN. It is the place which has the interrogation call routing function for mobile terminated calls. It enables the system to route calls to their final destination: the called mobile stations. In a GSM/PLMN network, all mobile terminated calls will be routed to a Gateway MSC.

A Mobile Switching Center ("MSC") area represents the part of the network that is covered by one MSC. In order to route a call to a mobile subscriber, the path through the network links to the MSC in the MSC area where the subscriber is currently located.

A Service Area ("SA") is the part of the network that is defined as an area in which a mobile station is obtainable, due to the fact that the MS is registered in a Visitor Location Register ("VLR"). The VLR is a database commonly located in the MSC (and referred to as MSC/VLR) temporarily containing information about all the MS's currently located in the MSC area. As soon as an MS roams into a new MSC area, the VLR connected to that MSC will request data about the MS from the Home Location Register ("HLR"). The VLR contains both subscriber information (received from the HLR) and information relating to the Location Area in which the MS is currently situated.

The HLR is also a database. When someone buys a subscription from an operator, he will be registered in the HLR of that operator. The HLR contains subscriber information, such as supplementary services and authentication parameters. Furthermore, there will be information about the location of the MS, i.e. in which MSC area the MS resides presently. This information changes as the MS moves around. The MS will send location information (via the MSC/VLR) to its HLR, thus providing means to receive a call.

In many systems the PLMN will be divided into one or several MSC/VLR Service Areas (it is often the case that the MSC Area and the Service Area cover exactly the same part of the network, while the MSC and VLR are implemented in the same node). Each MSC/VLR Service Area is divided into several Location Areas ("LA"). An LA is a part of the MSC/VLR Service Area in which a mobile station may move freely without updating location information to the MSC/VLR exchange that controls the LA. It is also the area where a paging message is broadcast in order to find the called mobile subscribe. An LA can have several cells and depend on one or more Base Station Controllers ("BSC"), but it belongs to only one MSC/VLR. It can also be identified by the system by using a Location Area Identity ("LAI").

The Location Area is divided into a number of Cells. The cell is an area of radio coverage that the network identifies with the Cell Global Identity ("CGI"). The MS distinguishes between cells using the same carrier frequencies by use of the Base Station Identity Code ("BSIC").

It is often the case that a Subscriber A, calling from e.g. the PSTN, wishes to call a Subscriber B in a particular PLMN (e.g. GSM). The connection is set up from Subscriber A's local exchange to the Gateway MSC of the GSM/PLMN network. The GMSC analyzes the number for Subscriber B. Using an interrogation function, the GMSC sends the Mobile Station ISDN ("MSISDN") number, with a request for a Mobile Station Roaming Number ("MSRN"), to the Home Location Register. The MSISDN is a number which uniquely identifies a mobile telephone subscription in the PSTN numbering plan. The HLR knows what Service Area Subscriber B is located in and translates the dialed mobile subscriber number (e.g. MSISDN) into a GSM/PLMN subscriber identity (e.g. IMSI): i.e. MSISDN→IMSI.

In order to provide a temporary number for routing, the HLR sends the IMSI of Subscriber B to the current MSC/VLR and requests it to temporarily allocate a MSRN to Subscriber B and return it. At reception of the MSRN, the HLR sends it to the GMSC, which can now route the call to the MSC/VLR exchange where the called subscriber is currently registered. The GSMC, now in possession of the correct MSRN, can now set up the incoming call to the Service Area where subscribe B is currently located.

The VLR points out the Location Area Identity ("LAI") for the called subscriber: i.e. IMSI→LAI. The MSC/VLR then sends a paging message to all transmitters within the Location Area. The Mobile Station may be idle and listening to the paging channel of one of the cells belong to the Location Area. It will receive the paging message, recognize the IMSI and send a response. After the call set-up, procedures are performed and the assignment of a traffic channel is done, the call is connected over the air path to the Mobile Station.

It is, however, possible that the MS is turned off. It is considered "detached". It cannot be reached by the network, because it doesn't answer a paging message. It also doesn't inform the system about possible changes of Location Area. Similarly, when the MS is turned on, it is called "attached". Both attach and detach are related to the International Mobile Subscriber Identity ("IMSI"). For a correct identification over the radio path and through the GSM/PLMN network, a specific identity is allocated to each subscriber. This identity is the IMSI and is used for all signalling within the PLMN. It is stored in the Subscriber Identity Module ("SIM", as smart card located in the MS), as well as in the HLR, system registration, and in the VLR, temporary registration. The IMSI consists of 3 parts, a Mobile Country Code, a Mobile Network Code, a Mobile Station Identification Number, and has a maximum length of 15 digits.

As mentioned above, a mobile station in an active state is marked "attached" by a flag on the IMSI. When the MS powers off, the MS sends a last message to the network, containing a request for the detach procedure. On reception of a "detached" message, the MSC/VLR marks the corresponding IMSI flag "detached". Only the VLR is updated with the "detached" information whereas the HLR is not informed.

If the MS sends an "IMSI detach" message to the system, and the radio link quality is too bad, the system might not be able to decode the information. Since no acknowledgement is sent to the MS, no further attempt is made. This means that the system will regard the MS as attached. Therefore, the MS is forced to register periodically, e.g. every 30 minutes. This is called "periodic registration". If the system does not receive the periodic registration it will mark the MS "detached" in its VLR, a procedure known as "implicit detach". This can also occur when the MS roams outside the coverage area of the PLMN and is no longer able to register periodically.

In the case where the Subscriber B is detached, either IMSI detached or implicitly detached, then Subscriber A will not be able to complete his call to Subscriber B. When the MS is marked detached the call attempt by Subscriber A is usually routed to a message service.

There is a problem with current message services. Current message services merely provide caller A with a recorded message such as "The subscriber you have called may be temporarily switched off OR out of the coverage area." This message is inadequate and of no help to caller A. Caller A knows that EITHER Subscriber B has switched off OR may have left the coverage area, but he doesn't know which. Lack of this knowledge means that it is difficult for caller A to know whether to attempt to call Subscriber B again, when he should call, and where he should call (e.g. another fixed line number).

SUMMARY OF THE INVENTION

Accordingly, it is the object of the present invention to meet the problem of enabling caller A to learn the time at which Subscriber B left the system or powered off.

It is another object of the present invention to meet the problem of enabling caller A to learn where Subscriber B was (e.g. what Location Area) at the time Subscriber B left the system or powered off.

It is yet another object of the present invention to meet the problem of enabling caller A to learn for what reason (e.g. either IMSI detach or implicit detach) Subscriber B left the system or powered off.

One method by which the present invention meets these objects is to provide a recorded message to caller A which details the type of detach that has occurred. In the preferred embodiment of the present invention Caller A will get a message similar to ones used in today's systems, e.g. "The subscriber you have called may be temporarily switched off or out of the coverage area". In an alternative embodiment Caller A will get either a message saying e.g. "The subscriber you have called is temporarily switched off" OR e.g. "The subscriber you have called is out of the coverage area". This method will provide more information than current message services.

In addition to the above message(s), caller A will also be provided with an optional Interrogation Service. This service can be offered to caller A in the form of e.g. an additional recorded announcement. Then, by choosing a suitable access code, caller A can receive additional information detailing the last time and date that a detach message was received from Subscriber B and the location where Subscriber B was last registered.

The method according to the present invention is thereby defined in appended claim 1. Further embodiments of the method appear from the appended dependent claims 2–14.

The advantages of these solutions to the problems include enhanced quality of service to the MS subscriber, thus achieving greater customer satisfaction. The Interrogation Facility is a new service which will automatically generate new revenue for operators of mobile systems. Also, the additional information presented in the situation of IMSI Detach, in particular the present location of a powered-off MS (e.g. the present Location Area of Subscriber B) may be sufficient to allow the called party to be contacted via an alternative number. This also increases operators' revenues.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

Figure 1:
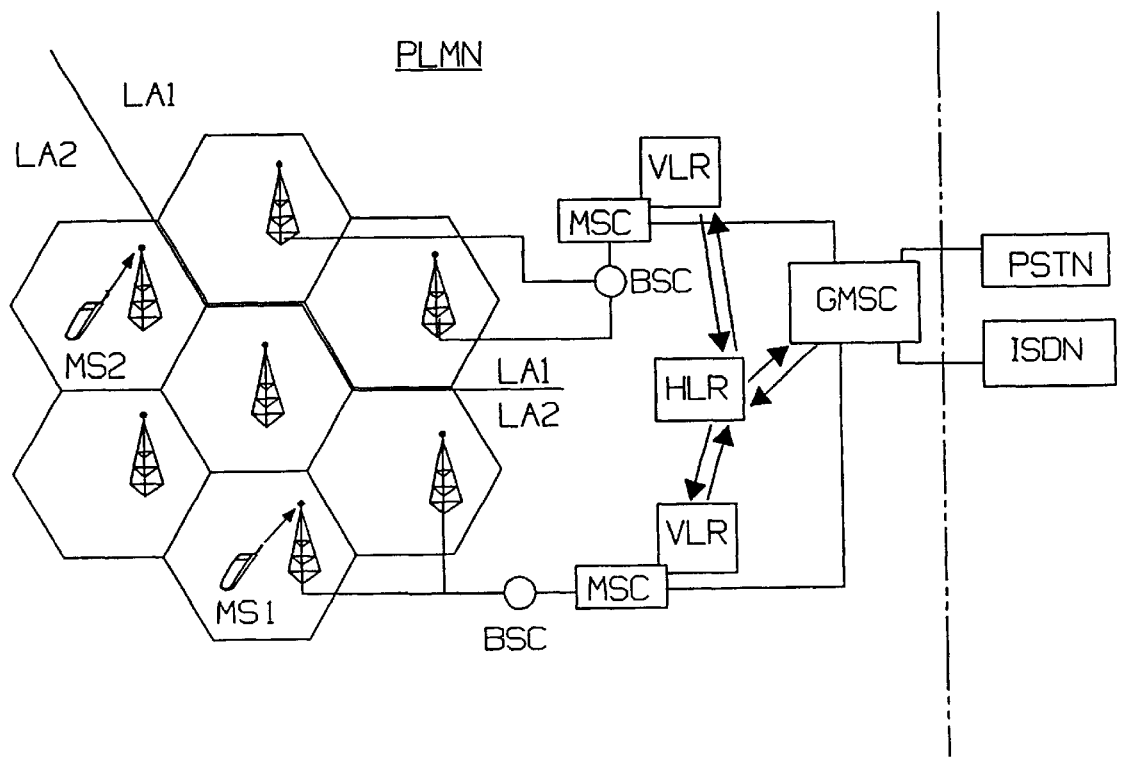
FIG. 1 is a drawing of a mobile communications system similar to one as implemented in GSM.
Figure 2:
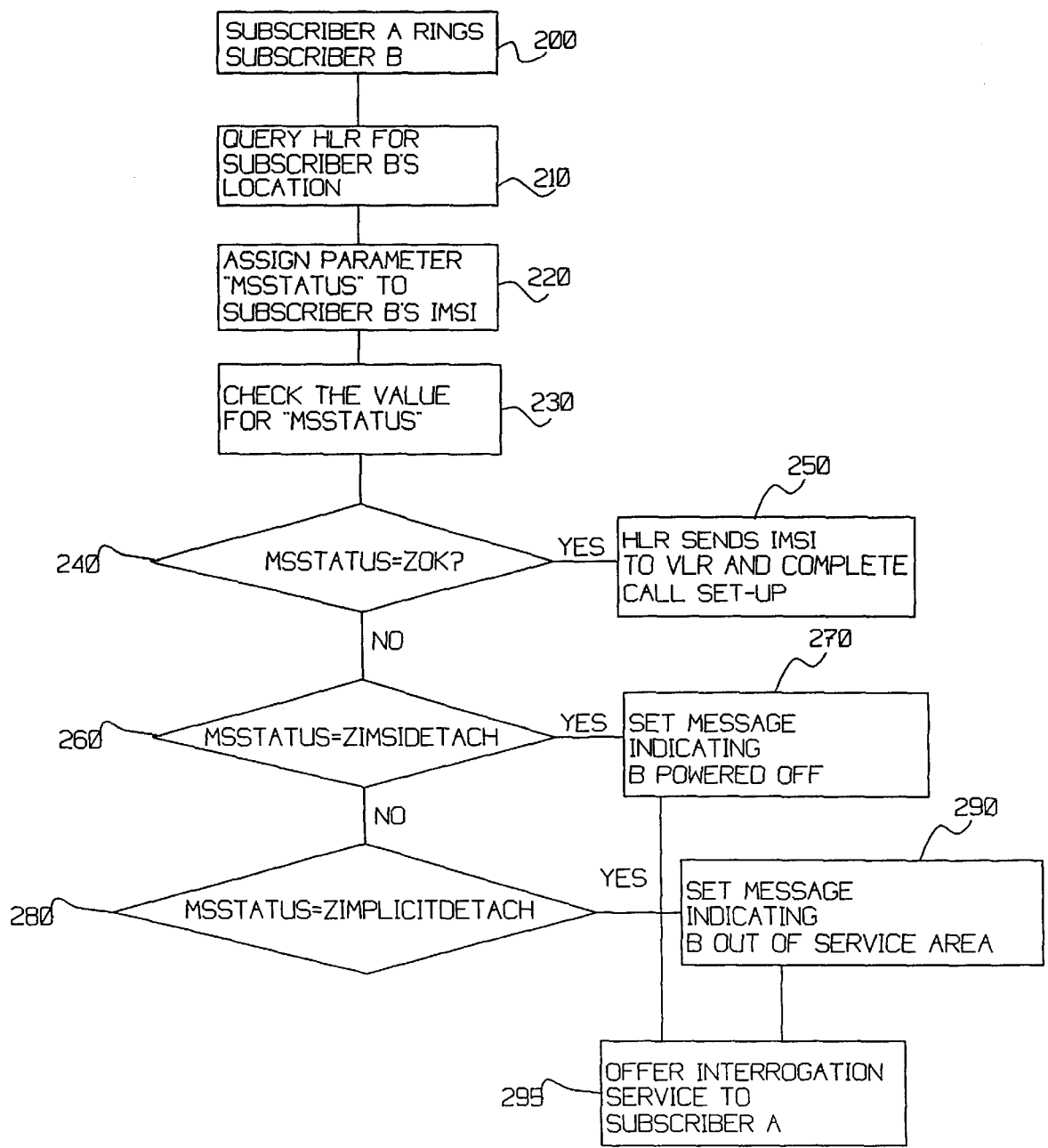
FIG. 2 is a flowchart illustrating steps according to the method of the present invention.

In FIG. 2 is illustrated a flowchart showing the steps of the present invention. The first method begins when a Subscriber A attempts to telephone Subscriber B, where Subscriber B is a subscriber to a PLMN 200. After all the necessary routing (if necessary) is completed, the Home Location Register serving the PLMN in which Subscriber B resides is queried about Subscriber B's location 210. The HLR translates Subscriber B's number into an IMSI.

The steps described above are currently a part of PLMN systems such as GSM. However, the next step differs from current practice. The next step is to assign a parameter MSSTATUS (i.e. "Mobile Station Status") to Subscriber B's IMSI 220. Parameter MSSTATUS will be assigned one of three values: ZOK, ZIMSIDETACH or ZIMPLICITDE-TACH. It will be located in the Home Location Register for the PLMN in which Subscriber B is located.

The next step of the method is to check the value of MSSTATUS 230. If MSSTATUS=ZOK 240 this means that the MS is powered on and is listening for pages, ready to receive a call. The HLR then sends the IMSI to the VLR 250 in the Service Area currently being visited by Subscriber B. Located in the VLR is a parameter (e.g. POWERON) which determines if the MS associated with the received IMSI is powered on or off. For example, if POWERON=YES then the call set-up will continue 250. The default value for MSSTATUS will be ZOK.

If Subscriber B has powered off then an IMSI Detach will occur. The VLR will send a message to its HLR with the following information: IMSI Detach occurrence, time and date of poweroff, and the last location, normally the Location Area, where the MS was located when the detach occurred. In the HLR the parameter is set to MSSTATUS= ZIMSIDETACH. In the case where MSSTATUS= ZIMSIDETACH 260, subsequent attempts to call Subscriber B will result in an announcement 270 (e.g. a recorded announcement or an alphanumeric message), e.g. "The subscriber you have called may be temporarily switched off OR out of the coverage area", indicating the unavailability of Subscriber B. In an alternative embodiment the message may be more precise, e.g. "Subscriber B has switched off", detailing the MS status as being powered off.

After either of these messages, the system will indicate the availability of an Interrogation Facility 295, discussed below. Although in the preferred embodiment the VLR will update the time and date for the detach before sending it to the HLR, the HLR may also update the time and date. The HLR has a real-time clock so that the time and date can be updated upon reception of the notice of a detach.

If, at any time, Subscriber B moves out of the coverage area of the PLMN, a time scanning function (i.e. periodic registration) in the Mobile Switching Center (MSC) detects this and marks the MS as Implicitly Detached. The MS can also be marked Implicitly Detached where e.g. Subscriber B removes the battery from the MS, the battery power is no longer sufficient to power the MS, or where Subscriber B attempts to power-off the MS but the signal is not received by the system. After the Implicit Detach, the MSC then informs its HLR of the Implicit Detach, time and date of detach and the location at the time of detach. Again, as in the case of an IMSI Detach, it is preferred for the VLR to update the time and date of detach before forwarding the information to the HLR. It is possible, however, for the HLR to update the time and date. After the HLR is informed of the Implicit Detach, the parameter MSSTATUS is then marked ZIMPLICITDETACH.

When MSSTATUS=ZIMPLICITDETACH 280 the attempt to call Subscriber B will result in an announcement 290, e.g. "The subscriber you have called may be temporarily switched off OR out of the coverage area", indicating the unavailability of Subscriber B. In an alternative embodiment there can be a message, e.g. "Subscriber B has moved out of the coverage area", detailing the MS status as out of the service area or has powered off but the power-off message wasn't received.

After sending one of these messages the system will also detail the availability of the Interrogation Facility 295. This announcement may be a recorded message or an alphanumeric message. For example, if Subscriber A is calling from a fixed PSTN line then a recorded message will be provided. If Subscriber A is calling from e.g. an ISDN line then an alphanumeric message may also be provided.

Figure 3:
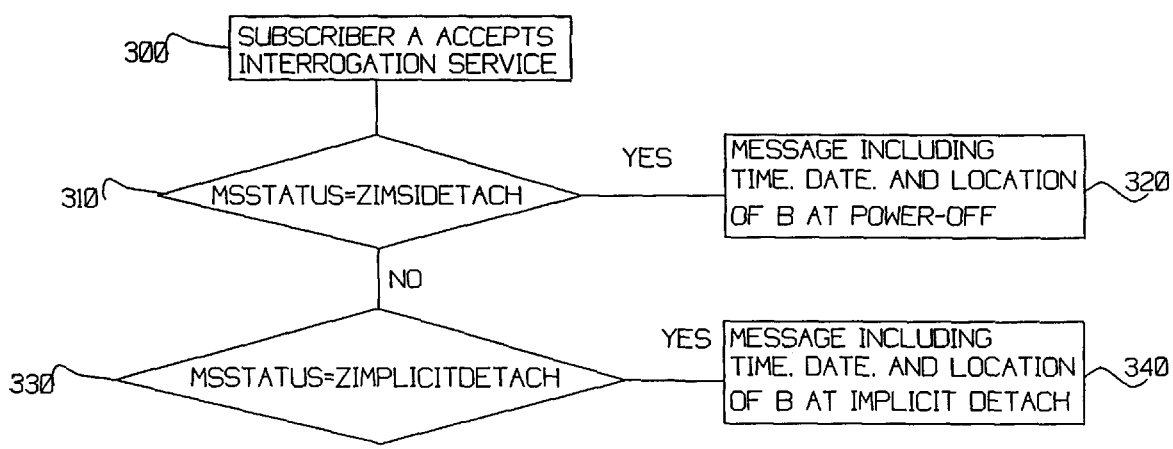
FIG. 3 is a flowchart illustrating further steps illustrating the steps of the Interrogation Service in the present invention.

In both cases where Subscriber A calls Subscriber B and receives the message that Subscriber B has powered-off, i.e. IMSI Detached, or moved out of the coverage area, i.e. Implicitly Detached, Subscriber A will get the option to accept the Interrogation Service as shown in FIG. 3. Subscriber A can accept this service 300 by merely entering a code by entering a symbol or sequence of alphanumeric symbols on the keypad of his telephone. If Subscriber A accepts this service 300 then the HLR will provide further time and date information.

In the case of MSSTATUS=ZIMSIDETACH 310 the HLR will provide the time, date and location of the MS at the time of power-off (i.e. IMSI Detach) 320. In the case of MSSTATUS=ZIMPLICITDETACH 330 the HLR will provide the time, date, and location of implicit detach 340. In the preferred embodiment of the present invention the Interrogation Service will be provided for all persons calling subscriber in the PLMN. It will be possible, however, to allow Subscriber B to request the system operator to block other subscribers from accessing the Interrogation Service and thereby learning the last time, date, and location at detach.

In addition to the time and date information, the Interrogation Service will send information about the last known location of the MS at the time of detach (either IMSI or implicit). In current systems, this geographic information will be the Location Area at the time of detach. Future systems might also implement various geographic locating systems such as GPS ("Global Positioning System"). In systems with GPS implemented, the location information sent to Subscriber A can be the longitude and latitude, or perhaps even the location on a given street, of Subscriber B.

The embodiments described above serve merely as illustration and not as limitation. It will be apparent to one of ordinary skill in the art that departures may be made from the embodiments described above without departing form the spirit and scope of the invention. The invention should not be regarded as being limited to the examples described, but should be regarded instead as being equal in scope to the following claims.

What is claimed is:

1. A method for providing information about a called Subscriber B's status in a mobile communication system, wherein Subscriber B is a subscriber to said mobile communication system and Subscriber A, being a subscriber in any communication system, first dials Subscriber B's number which is translated by a Home Location Register into an International Mobile Subscriber Identity (IMSI), said method comprising the steps of:

assigning a parameter to said IMSI;

assigning to said parameter one of three values, a first value indicating the status of Subscriber B as ready to receive a call, a second value indicating Subscriber B powered off and IMSI Detached, or a third value indicating that Subscriber B has moved out of the coverage area of said mobile system and is Implicitly Detached;

completing a call set-up from Subscriber A to Subscriber B if said parameter equals said first value;

providing a first message to Subscriber A indicating that Subscriber B is unavailable for calls if said parameter equals said second value;

providing a second message to Subscriber A indicating that Subscriber B is unavailable for calls if said parameter equals said third value; and providing a third message to Subscriber A, offering an Interrogation Facility to Subscriber A which provides further information about the unavailability of Subscriber B, if said parameter equals said second value or said third value.

2. The method of claim 1, wherein the step of assigning said first value to said parameter is performed if a Visitors Location Register (VLR) parameter, for a Service Area in which Subscriber B is located, equals YES.

3. The method of claim 1, wherein the step assigning said second value to said parameter is performed when Subscriber B has powered off.

4. The method of claim 1, wherein the step of assigning said third value to said parameter is performed when Subscriber B is no longer detected by periodic registration.

5. The method of claim 4, wherein Subscriber B is no longer detected because Subscriber B has moved out of a coverage area of said mobile communications system.

6. The method of claim 1, wherein said first message indicates that Subscriber B is powered off.

7. The method of claim 1, wherein said second message indicates that Subscriber B is out of a coverage area or no longer responding.

8. The method of claim 1, wherein Subscriber B has the facility to block Subscriber A from accessing the Interrogation Facility.

9. The method of claim 1 further comprising the steps of:
   Subscriber A accepting said Interrogation Facility;
   announcing to Subscriber A that Subscriber B has IMSI detached, the time and date of the IMSI Detach, and a location of Subscriber B at the time of IMSI Detach, if said parameter equals said second value; and
   announcing to Subscriber A that Subscriber B has Implicitly Detached, the time and date of the Implicit Detach, and a location of Subscriber B at the time of Implicit Detach if said parameter equals said third value.

10. The method of claim 9, wherein said location of Subscriber B is a Location Area at detach.

11. The method of claim 9, wherein said location of Subscriber B is a longitude and latitude of Subscriber B at detach.

12. The method of claim 11, wherein said longitude and latitude are provided by GPS.

13. The method of claim 1, wherein said messages are recorded announcements.

14. The method of claim 1, wherein said messages are alphanumeric symbols.

* * * * *